United States Patent [19]
Thompson

[11] 3,846,706
[45] Nov. 5, 1974

[54] CONTROL SYSTEM

[75] Inventor: Allen Thompson, Northwich, England

[73] Assignee: Sim-Chem Limited (formerly Simon-Carves Chemical Engineering Ltd.), Cheadle Heath, Stockport, England

[22] Filed: Mar. 5, 1973

[21] Appl. No.: 337,844

Related U.S. Application Data

[63] Continuation-in-part of Ser. No. 126,180, March 19, 1971, abandoned.

[30] Foreign Application Priority Data
Apr. 9, 1970 Great Britain.................... 16871/70

[52] U.S. Cl.......... 235/151.1, 137/608, 235/151.12
[51] Int. Cl. ........................ G06f 15/46, F17d 3/00
[58] Field of Search............ 235/151, 151.1, 151.12, 235/151.35; 137/608, 595, 624.11, 625.11, 625.46, 635

[56] References Cited
UNITED STATES PATENTS

| 3,052,262 | 9/1962 | McCann .......................... 137/635 |
| 3,227,219 | 1/1966 | Boyer et al. ................... 137/624.11 |
| 3,475,392 | 10/1969 | McCoy et al. ................. 235/151.12 |
| 3,552,436 | 1/1971 | Stewart............................. 137/608 |
| 3,580,282 | 5/1971 | Van Arsdale..................... 137/608 |
| 3,582,621 | 6/1971 | Lawler........................... 235/151.1 |
| 3,614,682 | 10/1971 | Smith........................... 235/151.12 |
| 3,623,077 | 11/1971 | Clark............................. 235/151.1 |

OTHER PUBLICATIONS

Metz et al.: The Digital/Pneumatic Transducer Meets DDC Actuator requirements, Tushr. Soc. of Am. Conference ISA 1967, 31-1-ACOS-67.

Primary Examiner—Felix D. Gruber
Attorney, Agent, or Firm—Norris & Bateman

[57] ABSTRACT

A computerized control system for a group of control devices comprises a plurality of combinations of control elements each including a set/hold amplifier receiving repeatedly from the computer a plurality of consecutive analogue signals quantifying the required settings for the control devices, a pneumatic line the pressure in which is determined by a current to pressure converter that senses the amplifier output, a plurality of pressure responsive valve setting devices each connected to the pneumatic line via a normally closed valve and operatively connected to one of the control devices, and valve actuators controlled by the computer for opening each valve to connect its respective assocaited setting device with the pneumatic line during each of the successive periods when the current to pressure converter is receiving an analogue signal quantifying the required setting by the control device associated with the respective associated setting means.

9 Claims, 1 Drawing Figure

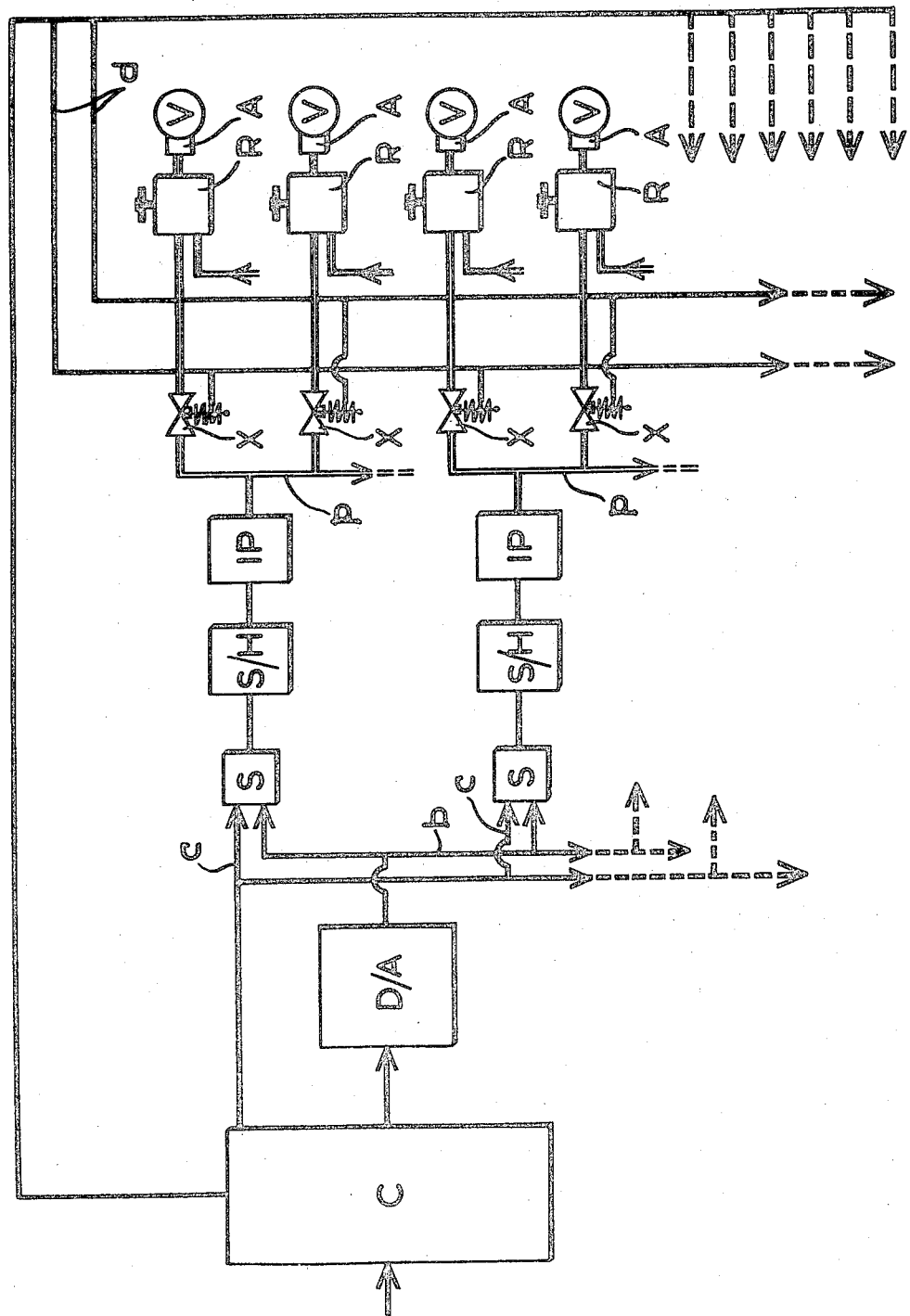

CONTROL SYSTEM

This is a continuation-in-part of Ser. No. 126,180 filed Mar. 19, 1971, now abandoned.

This invention concerns a control system particularly, though by no means exclusively, suitable for the control of chemical plant.

It is known, in large chemical plant installations, to provide a computer adapted repeatedly and rapidly to sense each of a plurality of conditions in the plant in turn and to adjust the setting of a plurality of plant control devices in response thereto to attain and maintain proper, safe and optimum operating conditions in the plant.

Such a computer is normally programmed to give consecutive digital outputs quantifying the setting required for each plant control device in turn. In a conventional arrangement the digital output from the computer is passed through a digital to analogue converter which feeds in turn through suitable switching arrangements controlled by the computer each of a plurality of control lines for the individual plant control devices. Each such line customarily includes a set/hold amplifier, a current to pressure converter and pneumatic pressure responsive setting means for the plant control device itself. Such an arrangement has a serious disadvantage in that a set/hold amplifier and current to pressure converter needs to be provided for each plant control device making the entire installation very costly.

The present invention is based on an appreciation of the fact that the digital to analogue converter, set/hold amplifier and current to pressure converter all operate very rapidly relative to the time required for the plant control devices themselves to be adjusted and hence of the possibility of utilising a single set/hold amplifier and current to pressure converter to control independently each of a plurality of plant control devices in turn.

Thus, according to the present invention a control system comprises at least one arrangement including a set/hold amplifier adapted to receive repeatedly a plurality of consecutive analogue signals quantifying the required settings for a plurality of control devices, a current to pressure converter which senses the output from said amplifier and controls the pressure in a pneumatic line in response thereto, a plurality of pneumatic pressure responsive setting means for said control devices each connected to said pneumatic line via a normally closed valve, and means adapted to open each said valve to connect the setting means for the control device associated therewith said pneumatic line during each of the successive periods when the current to pressure converter is receiving an analogue signal quantifying the required setting for that control device.

The invention will be further apparent from the following description with reference to the single figure of the accompanying DRAWING which shows, by way of example only, a schematic diagram for one form of control system embodying the invention.

The control system to be described is suitable for the operation of the control valves on a large chemical plant. For the purposes of this example we shall consider a plant having say sixty-four control valves whose settings need to be adjusted periodically to ensure that the plant operates properly and at optimum efficiency. The required settings for all of the valves at any time will be determined by physical conditions in the plant.

The system essentially includes a programming station such as a computer C which is programmed to perform two separate but related functions. Firstly, it is programmed to sense the conditions in the plant repeatedly and in accordance with a predetermined sequence to give a digital output quantifying the required setting for each of the plant control valves in turn. Secondly, it is programmed to generate signals whose function is to ensure that each digital output quantifying the required setting for a plant control valve is properly routed to that valve in a manner which will become apparent hereinafter. This second programming comprises successive routing of control to a plurality of different groups of control devices and successive operation of each of the control devices in the selected group, as will appear.

The digital output from the computer C quantifying the required setting for each of the plant control valves in turn is fed to a single digital to analogue converter D/A. The output from the digital to analogue converter D/A is fed to a busbar $b$ which is connected with eight set/hold amplifiers S/H via switches S, only two switches S and their associated equipment being shown in the drawing in the interests of clarity. Each set/hold amplifier feeds into a current to pressure converter I/P and each current to pressure converter feeds a pneumatic line $p$. Eight pneumatic pressure responsive setting means A having associated plant control valves V are provided for each pneumatic line $p$. Each setting means A is connected to its associated pneumatic line $p$ via an actuator such as a solenoid for a normally closed solenoid operable valve X and a booster relay R. Only two control valves V and their associated equipment are shown for each set/hold amplifier in the drawing, again in the interests of clarity.

It will thus be understood that the 64 control valves are arranged in eight groups of eight, each such group being supplied with air by a single current to pressure converter I/P.

During any one control cycle, that is during the period in which the settings of the 64 control valves are updated, the following operations take place.

The computer C gives the output digital signals quantifying the required setting for each control valve according to the following sequence. The first set of eight digital outputs in the cycle correspond with the first valves of each group, the second set of eight signals in the cycle correspond with the second valves of each group, and so on, with the last set of eight signals in the cycle corresponding with the eighth valves of each group.

The switches S are closed in turn by signals fed thereto by lines $c$ and generated by the computer C such that the eight signals of each set are routed successively to the eight set/hold amplifiers respectively. It will therefore be understood that after each successive set of eight digital signals, the eight pneumatic lines $p$ are at pressures quantifying the required settings for the eight control valves V (one from each group) next to be updated in the control cycle. At this time and before the generation of the next set of eight digital signals the one of the normally closed solenoid operable valves X in each group is opened by signals fed thereto by lines $d$ and generated by the computer C to feed the pressure in the lines $p$ to the booster relays controlling the eight valves V whose required settings are quantified by the output from the set/hold amplifiers during this period. After a short interval these solenoid valves X are closed under control of the computer C and the eight set/hold amplifiers are supplied by the ensuing eight digital outputs from the computer C in preparation for updating the settings of the next eight valves V (one from each group). It will be appreciated that there will be a separate line $c$ from the computer to each switch S and a separate line $d$ from the computer for each group of valves X, but for simplification of disclosure the lines labelled $c$ and $d$ in the drawing represent cables or sheaths each containing the necessary individual lines.

Once all 64 valves V have been adjusted the cycle is completed and the next control cycle can commence.

It will be appreciated that it is not intended to limit the invention to the above example only, many variations, such as might readily occur to one skilled in the art, being possible without departing from the scope thereof.

Thus, it will be appreciated that the number of individual control valves which can be controlled by a single set/hold amplifier and current to pressure converter will be determined by the total number of control valves in the installation, the frequency with which it is desired to reset each of the control valves in turn and the operating speeds of each of the different components in the system.

What is claimed is:

1. A control system for regulating cyclically a group of individual control devices comprising a signal generating programming station ($c$), at least one combination of control elements including a set/hold amplifier (S/H) connected to receive repeatedly from said station a plurality of consecutive analogue signals quantifying the required settings for the respective control devices, a pneumatic pressure line ($p$), a current to pressure converter (IP) connected to sense the output from said amplifier and act in response thereto to control the pressure in said pneumatic line, a plurality of pneumatic pressure responsive setting devices (A) each connected to said pneumatic line via a normally closed valve (X), each of said pressure responsive setting devices being operatively connected to one of the control devices, and actuators (at X) connected to be operated from said station for opening each of said valves to connect its respective associated setting means with said pneumatic line during each of the successive periods when the current to pressure converter is receiving an analogue signal quantifying the required setting by the control device associated with said respective associated setting device.

2. A control system according to claim 1 further comprising a plurality of additional combinations of control elements each combination being associated with a different group of control devices, said station comprising an analogue signal generating source, switch means connecting said combinations of control elements to said source so that said combinations of control elements receive said analogue signals from said source, the switch means being operated in such a manner that consecutive analogue signals generated by said source are fed to the plurality of combinations of control elements in accordance with a predetermined sequence.

3. A control system according to claim 2 wherein consecutive signals generated by said source are fed to each of said combinations of control elements turn.

4. A control system according to claim 1 in which the analogue signals fed to $a$ combination of control elements are derived, via a digital to analogue converter, from a station that comprises a computer connected to repeatedly and rapidly sense in turn each of a plurality of conditions determined by the setting of said control devices, and programmed to give output digital signals quantifying the required setting for those control devices.

5. A control system according to claim 2, in which the analogue signals fed to each combination of control elements are derived, via a digital to analogue converter, from a station comprising a computer connected to repeatedly and rapidly sense in turn each of a plurality of conditions determined by the setting of said control devices, and programmed to give output digital signals quantifying the required setting for those control devices.

6. A control system according to claim 3, in which the analogue signals fed to each combination of control elements are derived, via a digital to analogue converter, from a station comprising a computer connected to repeatedly and rapidly sense in turn each of a plurality of conditions determined by the setting of said control devices, and programmed to give output digital signals quantifying the required setting for those control devices.

7. A control system according to claim 1, in which said valves are solenoid operated valves.

8. A control system according to claim 1, in which the pressure responsive setting means for each control device is connected with the pneumatic line via a booster relay.

9. A control system according to claim 6, in which the pressure responsive setting means for each control device is connected with the pneumatic line via a booster relay.

* * * * *